United States Patent
Li et al.

(10) Patent No.: US 11,119,364 B2
(45) Date of Patent: Sep. 14, 2021

(54) LIQUID CRYSTAL PHASE SHIFTER, METHOD FOR OPERATING THE SAME, LIQUID CRYSTAL ANTENNA, AND COMMUNICATION APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Liang Li, Beijing (CN); Tienlun Ting, Beijing (CN); Jie Wu, Beijing (CN); Xue Cao, Beijing (CN); Ying Wang, Beijing (CN); Haocheng Jia, Beijing (CN); Cuiwei Tang, Beijing (CN); Peizhi Cai, Beijing (CN); Chuncheng Che, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/642,570

(22) PCT Filed: Aug. 9, 2019

(86) PCT No.: PCT/CN2019/100041
§ 371 (c)(1),
(2) Date: Feb. 27, 2020

(87) PCT Pub. No.: WO2020/030135
PCT Pub. Date: Feb. 13, 2020

(65) Prior Publication Data
US 2020/0257149 A1    Aug. 13, 2020

(30) Foreign Application Priority Data

Aug. 10, 2018   (CN) .................. 201810911837.X

(51) Int. Cl.
*G02F 1/1343*      (2006.01)
*G02F 1/13*        (2006.01)
(Continued)

(52) U.S. Cl.
CPC .......... *G02F 1/1343* (2013.01); *G02F 1/1313* (2013.01); *H01P 1/18* (2013.01); *H01Q 3/36* (2013.01); *H01Q 21/065* (2013.01)

(58) Field of Classification Search
CPC ........ G02F 1/1343; G02F 1/1313; H01P 1/18; H01Q 3/36; H01Q 21/065
See application file for complete search history.

(56) References Cited

U.S. PATENT DOCUMENTS

2014/0022029 A1    1/2014  Glushchenko et al.

FOREIGN PATENT DOCUMENTS

CN    106025452 A      10/2016
CN    107394318 A  *  11/2017   ............... H01P 1/18
(Continued)

*Primary Examiner* — Nathanael R Briggs
(74) *Attorney, Agent, or Firm* — Nath, Goldberg & Meyer; Joshua B. Goldberg

(57) ABSTRACT

A liquid crystal phase shifter is provided, and includes a first substrate and a second substrate opposite to each other, and a liquid crystal layer between the first substrate and the second substrate. The first substrate includes a first base plate and a first electrode layer at a side of the first base plate proximal to the liquid crystal layer. The second substrate includes a second base plate and a second electrode layer at a side of the second base plate proximal to the liquid crystal layer. The first electrode layer includes a main body structure having a first side and a second side opposite to each other with respect to a length direction of the main body (Continued)

structure, and a plurality of branch structures connected to at least one of the first side and the second side of the main body structure.

20 Claims, 5 Drawing Sheets

(51) Int. Cl.
*H01P 1/18* (2006.01)
*H01Q 3/36* (2006.01)
*H01Q 21/06* (2006.01)

(56) References Cited

FOREIGN PATENT DOCUMENTS

| CN | 107394318 A | 11/2017 |
| CN | 107994302 A | 5/2018 |
| CN | 108181745 A | 6/2018 |
| CN | 208384288 U | 1/2019 |

* cited by examiner

LIQUID CRYSTAL PHASE SHIFTER, METHOD FOR OPERATING THE SAME, LIQUID CRYSTAL ANTENNA, AND COMMUNICATION APPARATUS

CROSS REFERENCE TO RELATED APPLICATIONS

This is a National Phase Application filed under 35 U.S.C. 371 as a national stage of PCT/CN2019/100041, filed Aug. 9, 2019, an application claiming the benefit of Chinese Application No. 201810911837.X, filed Aug. 10, 2018, the content of each of which is hereby incorporated by reference in its entirety.

TECHNICAL FIELD

The present disclosure relates to the field of communication technologies, and in particular, to a liquid crystal phase shifter, a liquid crystal antenna, a communication apparatus, and a method for operating a liquid crystal phase shifter.

BACKGROUND

A phase shifter is a device capable of adjusting a phase of a microwave, is widely applied to electronic communication systems, and is a core component in systems such as phased array radars, synthetic aperture radars, radar electronic countermeasure systems, satellite communication systems, transceivers, and the like. High performance phase shifters therefore will play a crucial role in these systems.

SUMMARY

Embodiments of the present disclosure provide a liquid crystal phase shifter, a liquid crystal antenna, a communication apparatus, and a method for operating a liquid crystal phase shifter.

A first aspect of the present disclosure provides a liquid crystal phase shifter, including a first substrate and a second substrate opposite to each other, and a liquid crystal layer between the first substrate and the second substrate; wherein the first substrate includes a first base plate and a first electrode layer at a side of the first base plate proximal to the liquid crystal layer;

the second substrate includes a second base plate and a second electrode layer at a side of the second base plate proximal to the liquid crystal layer; and the first electrode layer includes a main body structure having a first side and a second side opposite to each other with respect to a length direction of the main body structure, and a plurality of branch structures connected to at least one of the first side and the second side of the main body structure.

In an embodiment, the second electrode layer is in a peripheral region of the second base plate, and an orthographic projection of the second electrode layer on the first base plate partially overlaps an orthographic projection of at least one of the plurality of branch structures on the first base plate.

In an embodiment, each of the first side and the second side of the main body structure is connected with the plurality of branch structures.

In an embodiment, the plurality of branch structures connected to the first side and the plurality of branch structures connected to the second side are symmetric about the main body structure.

In an embodiment, the second electrode layer includes a first conductive structure and a second conductive structure;

an orthographic projection of the first conductive structure on the first base plate partially overlaps an orthographic projection of at least one of the plurality of branch structures connected to the first side of the main body structure on the first base plate; and an orthographic projection of the second conductive structure on the first base plate partially overlaps an orthographic projection of at least one of the plurality of branch structures connected to the second side of the main body structure on the first base plate.

In an embodiment, the first electrode layer is a microstrip, and a ground electrode is at a side of the first base plate distal to the liquid crystal layer.

In an embodiment, the first and second conductive structures are connected to conductive terminals of the ground electrode through conductive wires, respectively, and at least one of a resistivity and an inductance of each of the conductive wires is less than a corresponding one of a resistivity and an inductance of an ITO material.

In an embodiment, the first and second conductive structures are both plate electrodes.

In an embodiment, only one of the first side and the second side of the main body structure is connected with the plurality of branch structures, and the second electrode layer is at only one side of the second base plate corresponding to the plurality of branch structures.

In an embodiment, the second electrode layer is a plate electrode.

In an embodiment, the first electrode layer is a microstrip, and a ground electrode is at a side of the first base plate distal to the liquid crystal layer.

In an embodiment, the second electrode layer is connected to a conductive terminal of the ground electrode through a conductive wire, and at least one of a resistivity and an inductance of the conductive wire is less than a corresponding one of a resistivity and an inductance of an ITO material.

In an embodiment, the plurality of branch structures at a same side of the main body structure have a same shape.

In an embodiment, every adjacent two of the plurality of branch structures at the same side have a same distance therebetween.

In an embodiment, the main body structure and the plurality of branch structures at either of the first and second sides are an integrally formed structure.

In an embodiment, a material of the first substrate includes at least one of glass, ceramic and high-purity quartz glass.

In an embodiment, the liquid crystal layer includes positive liquid crystal molecules, and an angle between a long axis direction of each of the positive liquid crystal molecules and a plane where the first base plate is located is greater than 0 degree and equal to or less than 45 degrees.

In an embodiment, the liquid crystal layer includes negative liquid crystal molecules, and an angle between a long axis direction of each of the negative liquid crystal molecules and a plane where the first base plate is located is greater than 45 degrees and smaller than 90 degrees.

In an embodiment, the main body structure of the first electrode layer includes an impedance matching region, which is triangular or trapezoidal in a plan view, and is configured to make impedances of portions of the first electrode layer match to each other.

In an embodiment, a thickness of a portion of the liquid crystal layer between the first electrode layer and the second electrode layer is in a range of 5 microns to 20 microns.

A second aspect of the present disclosure provides a liquid crystal antenna, including the liquid crystal phase shifter according to any one of the embodiments of the present disclosure.

A third aspect of the present disclosure provides a communication apparatus, including the liquid crystal antenna according to the embodiment of the present disclosure.

A fourth aspect of the present disclosure provides a method for operating a liquid crystal phase shifter, wherein the liquid crystal phase shifter is the liquid crystal phase shifter according to any one of the embodiments of the present disclosure, and the method includes applying a first voltage to the first electrode layer; and applying a second voltage different from the first voltage to the second electrode layer to generate an electric field between the first electrode layer and the second electrode layer, such that long axes of liquid crystal molecules of the liquid crystal layer are substantially parallel or substantially perpendicular to a direction of the electric field.

DETAILED DESCRIPTION

Figure 1:
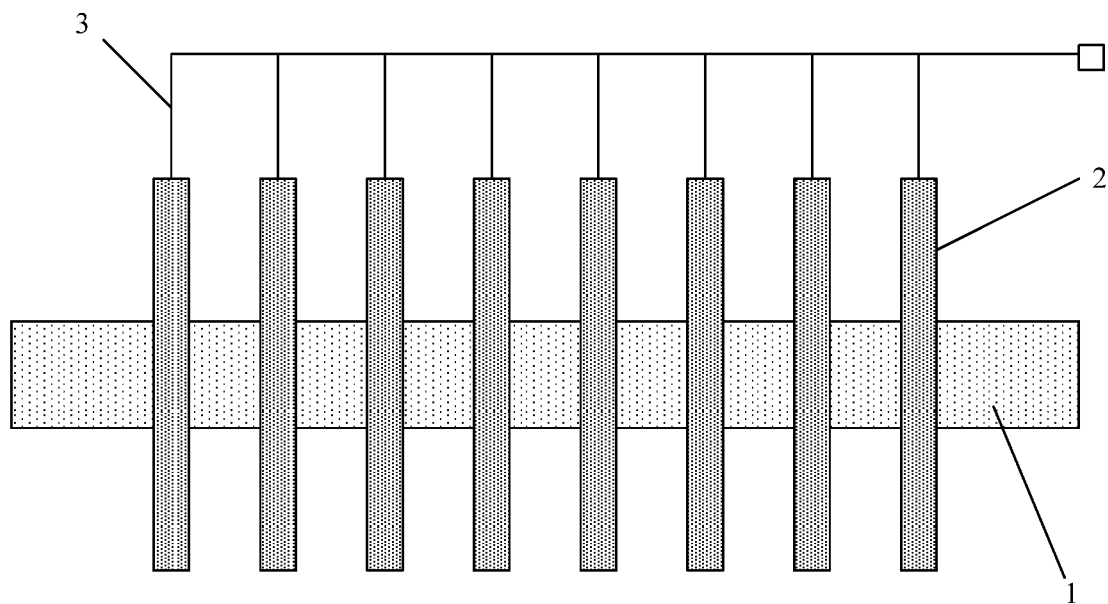
FIG. 1 is a schematic top view of a liquid crystal phase shifter according to an embodiment of the present disclosure.

To enable one of ordinary skill in the art to better understand the technical solutions of the present disclosure, the present disclosure will be further described in detail below with reference to the accompanying drawings and exemplary embodiments.

Unless otherwise defined, technical or scientific terms used in the present disclosure (including embodiments and claims) should have the ordinary meaning as understood by one of ordinary skill in the art to which the present disclosure belongs. The use of "first," "second," and the like in the present disclosure is not intended to indicate any order, quantity, or importance, but rather is used for distinguishing one element from another. The word "comprising," "including", or the like, means that the element or item preceding the word contains the element or item listed after the word and the equivalents thereof, but does not exclude the presence of other elements or items. The terms "connected," "coupled", or the like is not limited to physical or mechanical connections, but may include electrical connections, whether direct or indirect connections. The wording "upper," "lower," "left," "right," and the like are used only for indicating relative positional relationships in the drawings, and when the absolute position of the object being described is changed, these relative positional relationships may also be changed accordingly.

It is to be understood that when an element such as a layer, film, region or substrate is referred to as being "on" or "under" another element, it can be "directly on" or "directly under" the other element or intervening elements may be present.

An embodiment of the present disclosure provides a liquid crystal phase shifter, as shown in FIG. 1. The liquid crystal phase shifter includes first and second substrates disposed opposite to each other, and a liquid crystal layer (not shown in FIG. 1) disposed between the first and second substrates. A Microstrip (which may also be referred to as "microstrip line") 1 is arranged at a side of the first substrate proximal to the liquid crystal layer, and a plurality of metal patches 2 are periodically arranged at a side of the second substrate proximal to the liquid crystal layer. The plurality of metal patches are connected to a ground electrode (which is shown as a rectangular box in the upper right corner of FIG. 1 and may be located at a side of the first substrate distal to the liquid crystal layer) by a plurality of indium tin oxide (ITO) leads 3, respectively. For the liquid crystal phase shifter, it is possible to change the dielectric constant of the liquid crystal layer, by applying a first voltage to the microstrips 1 and applying a second voltage different from the first voltage to the plurality of metal patches 2 to form an electric field between the microstrips 1 and the plurality of metal patches 2 so as to drive liquid crystal molecules in the liquid crystal layer to rotate, thereby changing the value of capacitance formed by the microstrips 1 and the plurality of metal patches 2 due to the microstrips 1 at least partial overlapping the plurality of metal patches 2 in a direction perpendicular to the first substrate or the second substrate. In this way, a phase shift of a microwave signal is achieved (i.e. a phase of the microwave signal is changed).

However, the inventors of the present inventive concept found that, in the liquid crystal phase shifter shown in FIG. 1, since each metal patch 2 is connected to the ground electrode through the corresponding ITO lead 3, and since the inductance and resistance of each ITO lead 3 are relatively large, in a case that the inductance and the resistance of each ITO lead 3 are changed by a certain amount, the certain amount will result in a small change amount of the capacitance formed by the microstrip 1 and the plurality of metal patches 2. Thus, a microwave signal will not be subjected to a sufficiently large change of the capacitance formed by the microstrip 1 and the metal patches 2, and therefore a desired phase shift of the microwave signal may not be achieved.

Accordingly, some embodiments of the present disclosure provide a liquid crystal phase shifter that can effectively shift a phase of a microwave signal.

An embodiment of the present disclosure provides a liquid crystal phase shifter, including: a first substrate and a second substrate disposed opposite to each other, and a liquid crystal layer positioned between the first substrate and the second substrate. The first substrate include a first base plate, and a first electrode layer positioned at a side of the first base plate proximal to the liquid crystal layer. The first electrode layer includes a main body structure having a first side and a second side opposite to each other with respect to a length direction of the main body structure, and a plurality of branch structures connected to at least one of the first side and the second side of the main body structure. The second substrate includes a second base plate, and a second electrode layer at a side of the second base plate proximal to the liquid crystal layer. The second electrode layer is located in a peripheral region of the second base plate, and an orthographic projection of the second electrode layer on the first base plate partially overlaps an orthographic projection of at least one (e.g., each) of the plurality of branch structures on the first base plate.

In the phase shifter according to the present embodiment, the first electrode layer may not only transmit microwave signals, but also receive a first voltage applied thereto. The second electrode layer may receive a second voltage different from the first voltage applied thereto. As such, an electric field will be formed between the branch structures of the first electrode layer and the second electrode layer to drive the liquid crystal molecules of the liquid crystal layer to rotate, thereby changing a dielectric constant of the liquid crystal layer, and achieving a phase shift of a microwave signal. In the present embodiment, since the second electrode layer is disposed in the peripheral region of the second base plate, a length of each ITO lead for applying the second voltage to the second electrode layer may be shortened, and thus the inductance and resistance of the ITO lead may be reduced, thereby achieving a phase shift of a microwave signal effectively.

Figure 2:
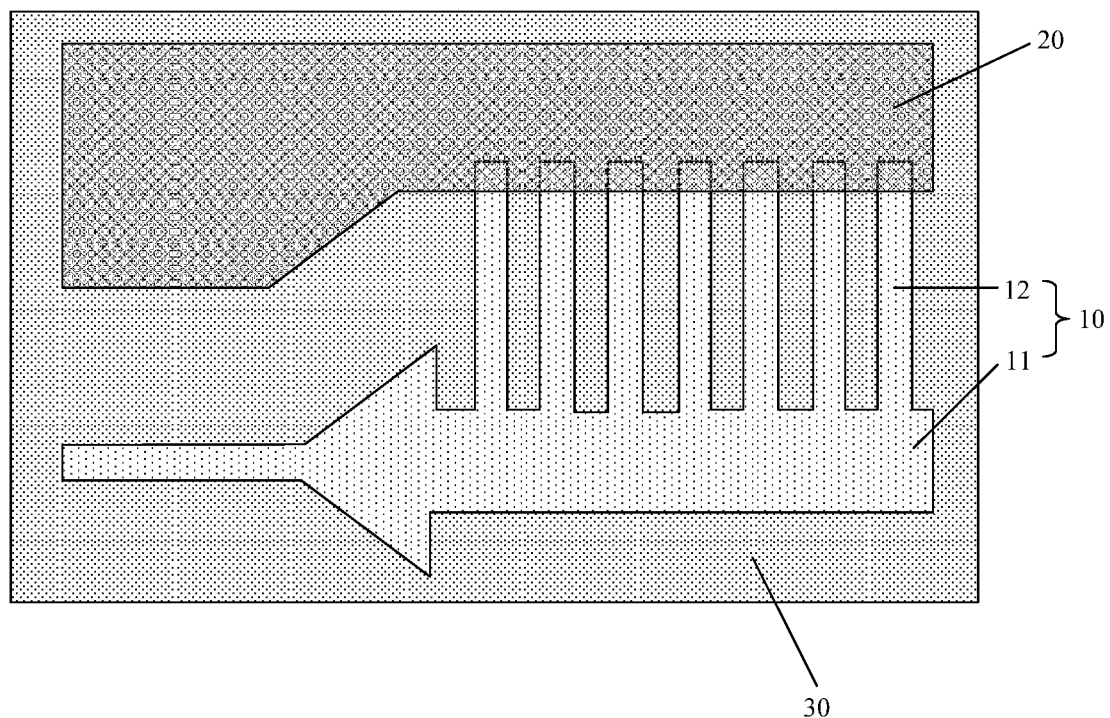
FIG. 2 is a schematic top view of a liquid crystal phase shifter according to an embodiment of the present disclosure.
Figure 3:
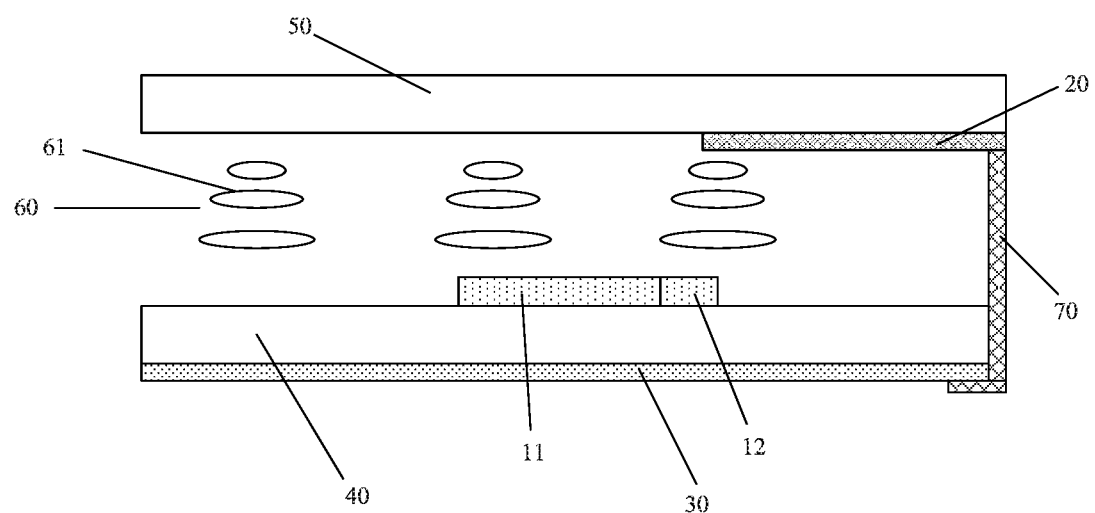
FIG. 3 is a schematic side view of a liquid crystal phase shifter according to an embodiment of the present disclosure.

As shown in FIGS. 2 and 3 (e.g., FIG. 3 may be a side view of FIG. 2 viewed from the right side of FIG. 2), an embodiment of the present disclosure provides a liquid crystal phase shifter including: a first substrate and a second substrate disposed opposite to each other, and a liquid crystal layer 60 disposed between the first substrate and the second substrate. The first substrate includes a first base plate 40, and a first electrode layer 10 at a side of the first base plate 40 proximal to the liquid crystal layer 60. The first electrode layer 10 includes a main body structure 11 having a first side (e.g., an upper side in FIG. 2) and a second side (e.g., a lower side in FIG. 2) opposite to each other with respect to a length direction (e.g., the horizontal direction in FIG. 2) of the main body structure 11, and the first electrode layer 10 further includes a plurality of branch structures 12 connected to the first side of the main body structure 11 and arranged periodically. The second substrate includes a second base plate 50 and a second electrode layer 20 at a side of the second base plate 50 proximal to the liquid crystal layer 60. The second electrode layer 20 of the second substrate is located in a peripheral region of the second base plate 50, and located at a position corresponding to the plurality of branch structures 12 on the first base plate 40. For example, the second electrode layer 20 is located in the peripheral region of the second base plate 50, and an outer end (e.g., the right end in FIG. 3) of the second electrode layer 20 is flush with the corresponding end (e.g., the right end in FIG. 3) of the second base plate 50. An orthographic projection of the second electrode layer 20 on the first base plate 40 partially overlaps an orthographic projection of at least one (e.g., may be each) of the plurality of branch structures 12 on the first base plate 40 (or on the second base plate 50). Alternatively, a plurality of branch structures 12 may also be connected to the second side of the main body structure 11. In the present embodiment, description is made by taking the case that the plurality of branch structures 12 are connected to the first side of the main body structure 11 as an example.

For example, the first electrode layer 10 may be a microstrip (i.e., the microstrip includes the main body structure 11 and the branch structures 12, and the main body structure 11 and the branch structures 12 are integrally formed). A ground electrode 30 may be further disposed at a side of the first base plate 40 distal to the microstrip, and orthographic projections of the first electrode layer 10 and the ground electrode 30 on the first base plate 40 at least partially overlap each other. For example, each end of the ground electrode 30 and the corresponding end of the first base plate 40 may be flush with each other. The ground electrode 30 and the microstrip (i.e., the first electrode layer 10) form a microwave transmission structure such that most of microwave signal(s) fed into the microstrip by a feed interface will be transmitted in the first base plate 40 between the ground electrode 30 and the microstrip. In order to reduce the loss of the microwave signal(s), the first base plate 40 may be made of a material such as glass, ceramic, or the like. This material does not substantially absorb the microwave signal(s) and thus the loss of the microwave signal(s) is small. Further, a small part of the microwave signal(s) will be transmitted in the liquid crystal layer 60. When a voltage is applied across the microstrip and the second electrode layer 20, the liquid crystal molecules 61 will be driven to rotate, and the dielectric constant of the liquid crystal layer 60 will be changed, thereby a phase shift of each of the microwave signal(s) transmitted in the liquid crystal layer 60 is realized. The microwave signal in the first base plate 40 and the microwave signal in the liquid crystal layer 60 are then interactively transmitted, thereby achieving an overall phase shift of the microwave signal(s). In other words, a large part of the microwave signal(s) transmitted in the first base plate 40 and a small part of the microwave signal(s) transmitted in the liquid crystal layer 60 may undergo a same phase shift.

For example, the second electrode layer 20 may be connected with a corresponding one of conductive terminals of the ground electrode 30 (e.g., both ends of the ground electrode 30) through a conductive wire 70, as shown in FIG. 3. In this case, the ground electrode 30 and the second electrode layer 20 will be provided with a same signal, and this connection facilitates the control of the phase shifter and also simplifies the wiring of the phase shifter. For example, at least one of the resistivity and the inductance of the conductive wire 70 may be less than a respective one of the resistivity and the inductance of the ITO material. For example, a material of the conductive wire 70 may be metal (i.e., the conductive wire 70 may be a metal connection line), and the metal may be copper, but is not limited thereto, and may also be silver, etc. Alternatively, it is also possible to provide a conductive terminal at an edge of the second substrate (e.g., the right edges of the second base plate 50 and the second electrode layer 20 shown in FIG. 3), so as to separately control the ground electrode 30 and the second electrode layer 20. The length of conductive wire 70 is significantly less than the length of each of the ITO leads shown in FIG. 1, and the resistivity and inductance of the metal (e.g., copper) are less than those of ITO, respectively. Therefore, a certain amount of change in the resistivity and inductance of the conductive wire 70 may cause a large amount of change in the capacitance formed by the second electrode layer 20 and the first electrode layer 10, thereby easily achieving a desired amount of phase shift of a microwave signal.

For example, the sizes of the branch structures 12 of the first electrode layer 10 are the same, and the distances between every adjacent two of the branch structures are the same. Alternatively, the distances between every adjacent two of the branch structures 12 may also be distributed according to a predetermined rule. And a width of a portion of each branch structure 12 overlapping the second electrode layer 20 may be different from a width of the remaining portion of the branch structure 12, so that a size of an overlapping area of the branch structure 12 and the second electrode layer 20 may be adjusted, thereby adjusting a value of the formed capacitance, as shown in FIG. 4C. Such configuration may be set according to the requirements of an actual product.

For example, in the present embodiment, the main body structure 11 and the branch structures 12 of the microstrip may be formed as an integral structure, i.e., the main body structure 11 and the branch structures 12 may be formed in a same layer and made of a same material. As such, both of the main body structure 11 and the branch structures 12 may be formed by one patterning process, thereby increasing the production efficiency thereof.

For example, each of the first base plate 40 and the second base plate 50 may be a glass substrate with a thickness of 100 microns to 1000 microns, or a sapphire substrate, or may be a polyethylene terephthalate substrate, a triallyl cyanurate substrate, or a transparent flexible polyimide substrate, which has a thickness of 10 microns to 500 microns. For example, each of the first base plate 40 and the second base plate 50 may be made of high-purity quartz glass having extremely low dielectric loss. Compared with a general glass substrate, the first base plate 40 and/or the second base plate 50 made of high-purity quartz glass may reduce the loss of microwaves effectively, thereby ensuring the phase shifter to have low power consumption and a high signal-to-noise ratio. For example, the high-purity quartz glass may refer to quartz glass in which the weight percentage of $SiO_2$ is 99.9% or more.

For example, a material of each of the microstrip, the ground electrode 30, and the second electrode layer 20 may include a metal such as aluminum, silver, gold, chromium, molybdenum, nickel, iron, or the like.

For example, the liquid crystal molecules 61 of the liquid crystal layer 60 may be positive liquid crystal molecules 61 or negative liquid crystal molecules 61. It should be noted that, in a case where the liquid crystal molecules 61 are positive liquid crystal molecules 61, an angle between a long axis direction of each liquid crystal molecule 61 and a plane where the first base plate 40 (or the second base plate 50) is located is greater than 0 degree and is equal to or less than 45 degrees. In a case where the liquid crystal molecules 61 are negative liquid crystal molecules 61, an angle between the long axis direction of each liquid crystal molecule 61 and the plane where the first base plate 40 (or the second base plate 50) is located is greater than 45 degrees and smaller than 90 degrees. As such, it is guaranteed that the dielectric constant of the liquid crystal layer 60 is changed after the liquid crystal molecules 61 are driven to rotate, thereby achieving the purpose of phase shifting.

The microstrip of the phase shifter according to the present embodiment may not only transmit microwave signals, but also receive a first voltage applied to the microstrip, and the second electrode layer 20 may receive a second voltage, which is different from the first voltage, applied to the second electrode layer 20. As such, an electric field may be formed between the plurality of branch structures 12 of the microstrip and the second electrode layer 20 to drive the liquid crystal molecules 61 of the liquid crystal layer 60 to rotate, thereby changing the dielectric constant of the liquid crystal layer 60, and achieving a phase shift of a microwave signal. Further, in the present embodiment, since the second electrode layer 20 is disposed in the peripheral region of the second base plate 50, the length of the conductive wire 70 for applying the second voltage to the second electrode layer 20 may be shortened, and the inductance and the resistance of the conductive wire 70 may be further reduced. In this way, a more effective phase shift may be performed on the microwave signal.

Figure 4A:
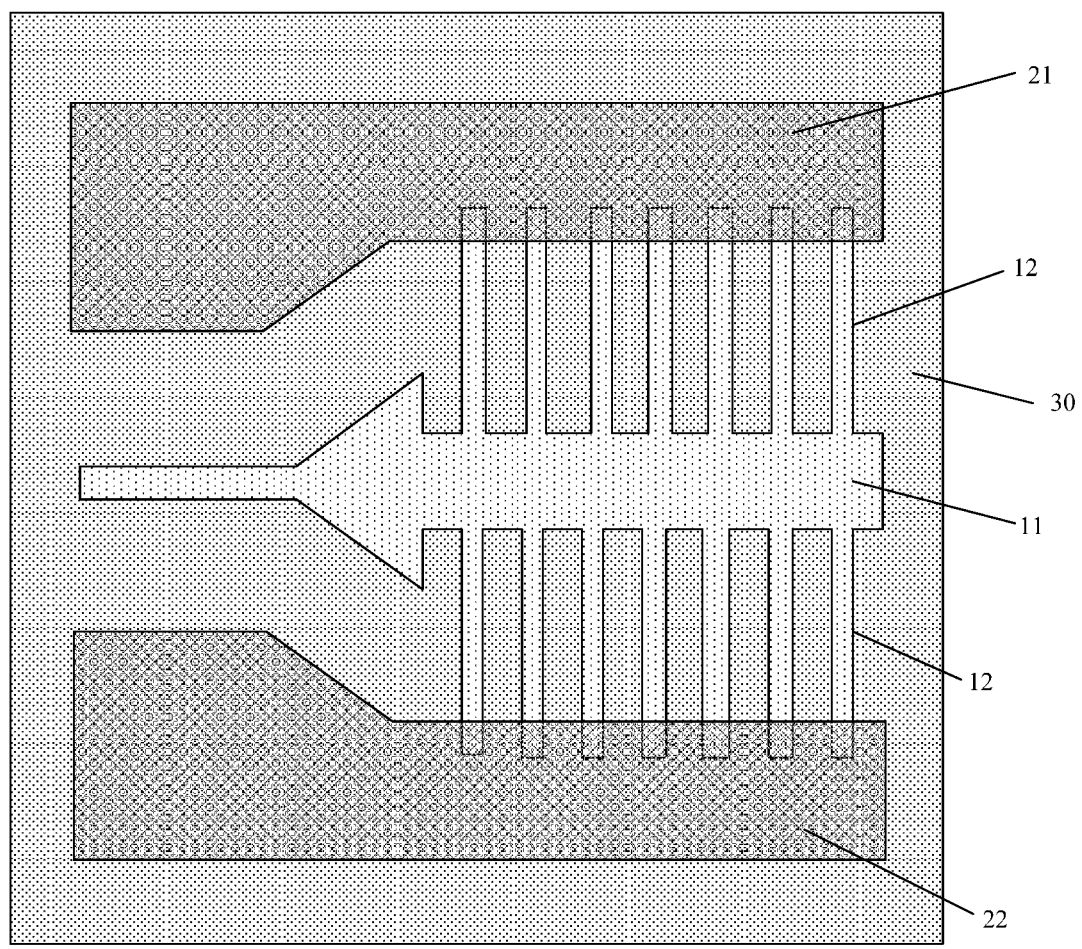
FIGS. 4A to 4C are schematic top views of liquid crystal phase shifters according to some embodiments of the present disclosure.
Figure 4B:
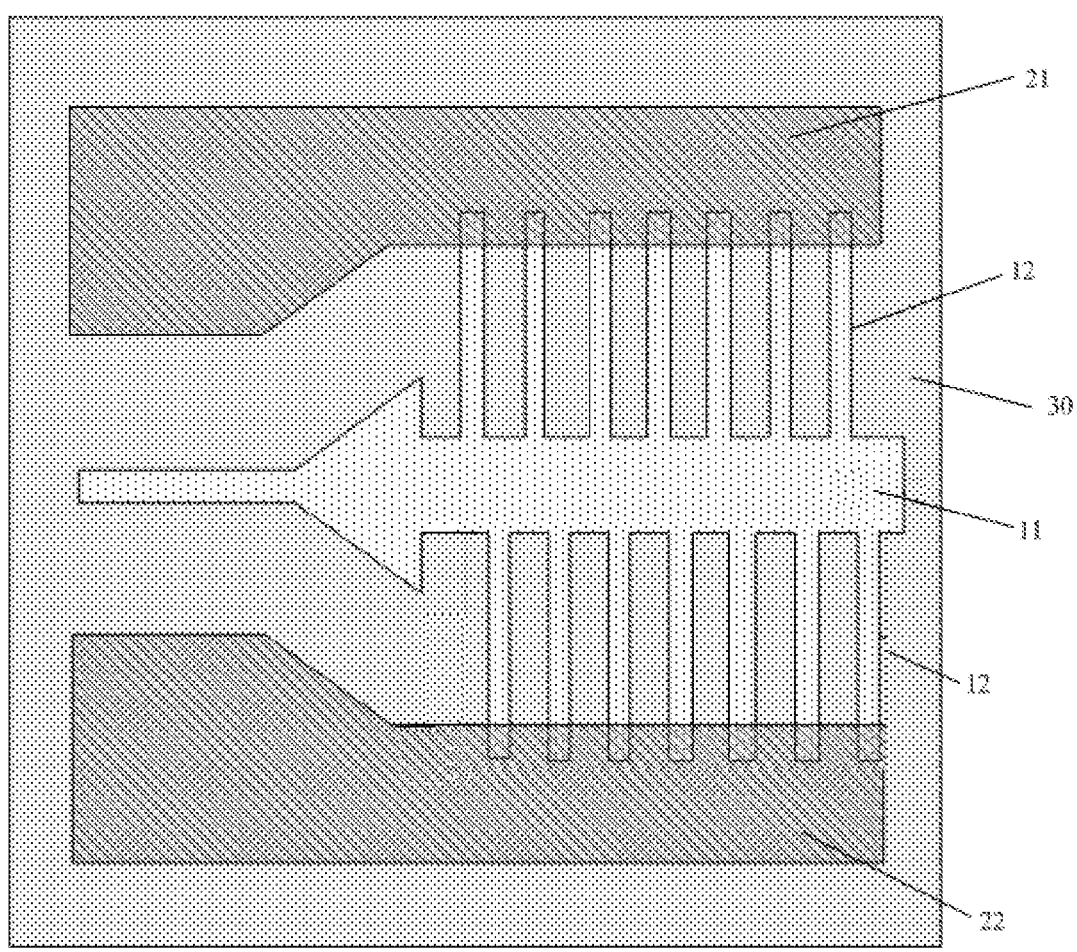
Figure 4C:
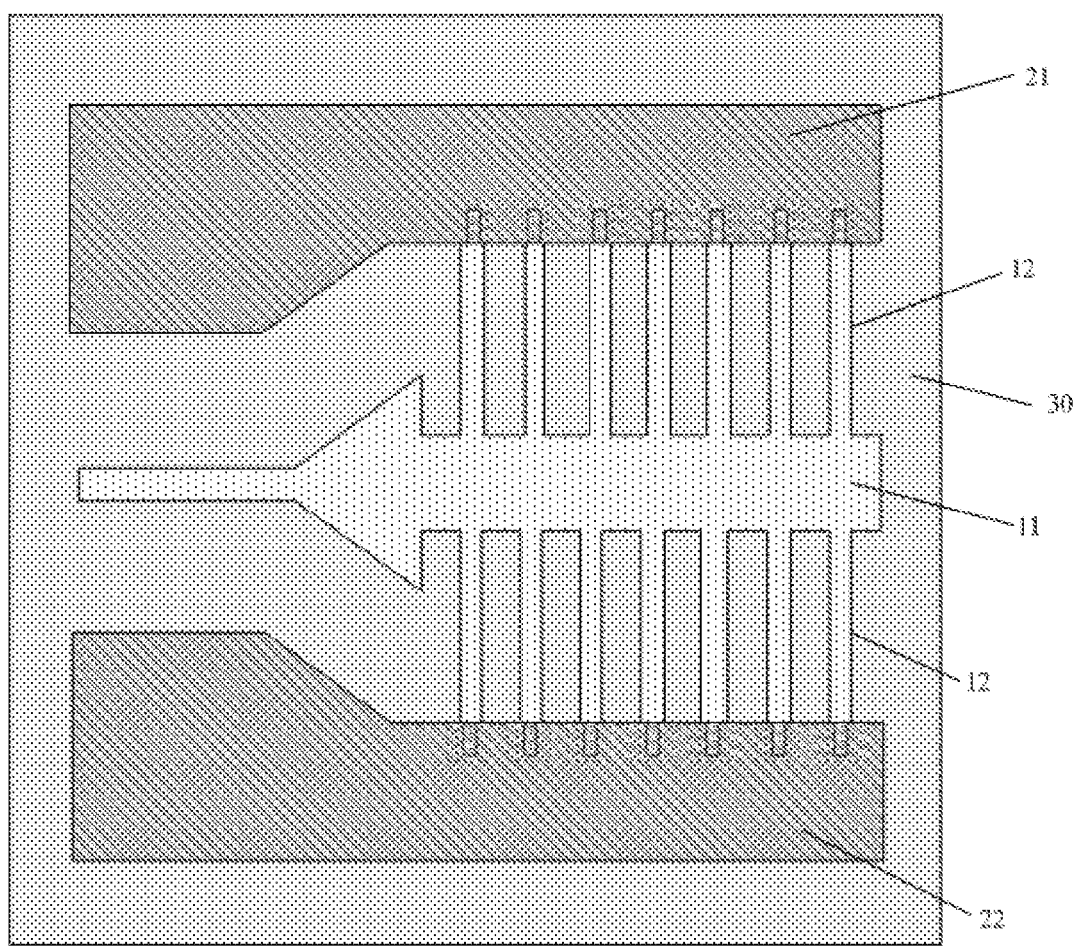
Figure 5:
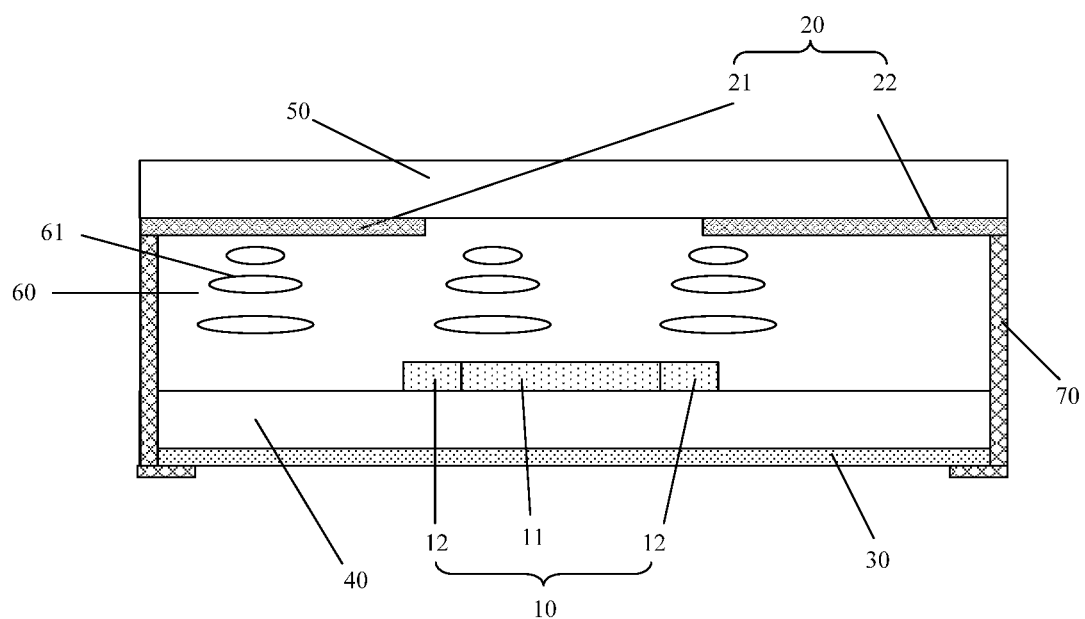
FIG. 5 is a schematic side view of a liquid crystal phase shifter according to an embodiment of the present disclosure.

As shown in FIGS. 4A to 5 (e.g., FIG. 5 may be a side view of FIG. 4A viewed from the right side of FIG. 4A), the present embodiment provides another liquid crystal phase shifter, including: a first substrate and a second substrate disposed opposite to each other, and a liquid crystal layer 60 between the first substrate and the second substrate. The first substrate include a first base plate 40, and a first electrode layer 10 at a side of the first base plate 40 proximal to the liquid crystal layer 60. The first electrode layer 10 includes a main body structure 11 having a first side (e.g., an upper side in FIG. 4A) and a second side (e.g., a lower side in FIG. 4A) opposite to each other with respect to a length direction (e.g., the horizontal direction in FIG. 4A) of the main body structure 11, and the first electrode layer 10 further includes a plurality of branch structures 12 connected to each of the first side and the second side of the main body structure 11. The plurality of branch structures 12 connected to the first side and the plurality of branch structures 12 connected to the second side may be symmetric (as shown in FIG. 4A) or asymmetric (as shown in FIG. 4B) about the main body structure 11. The second electrode layer 20 includes a first conductive structure 21 and a second conductive structure 22 located in peripheral regions of the second base plate 50, respectively (e.g., a left end of the first conductive structure 21 and a left end of the second base plate 50 may be flush with each other, and a right end of the second conductive structure 22 and a right end of the second base plate 50 may be flush with each other, as shown in FIG. 5). Further, an orthographic projection of the first conductive structure 21 on the first base plate 40 partially overlaps an orthographic projection of at least one (e.g., may be each) of the plurality of branch structures 12 connected to the first side (e.g., the upper side in FIG. 4A) of the main body structure 11 on the first base plate 40, and an orthographic projection of the second conductive structure 22 on the first base plate 40 overlaps an orthographic projection of at least one (e.g., may be each) of the plurality of branch structures 12 connected to the second side (e.g., the lower side in FIG. 4A) of the main body structure 11 on the first base plate 40.

For example, the first electrode layer 10 may be a microstrip (i.e., the microstrip includes the main body structure 11 and the plurality of branch structures 12 connected to each of the first side and the second side of the main body structure 11, and the main body structure 11 and all of the branch structures 12 are an integrally formed structure), a ground electrode 30 may be further disposed at a side of the first base plate 40 distal to the microstrip, and orthographic projections of the microstrip (i.e., the first electrode layer 10) and the ground electrode 30 on the first base plate 40 at least partially overlap each other. For example, each end of the ground electrode 30 may be flush with a corresponding end of the first base plate 40. The ground electrode 30 and the microstrip form a microwave transmission structure such that most of the microwave signal(s) fed into the microstrip by a feed interface will be transmitted in the first base plate 40 between the ground electrode 30 and the microstrip. As described above, in order to reduce the loss of the microwave signal(s), the first base plate 40 may be made of glass, ceramic, or the like. As such, the first base plate 40 does not substantially absorb the microwave signal(s), so that the loss of the microwave signal is small. Further, a small part of the microwave signal(s) will be transmitted in the liquid crystal layer 60. When a first voltage is applied to the microstrip, and a second voltage different from the first voltage is applied to the first conductive structure 21 and the second conductive structure 22, the liquid crystal molecules 61 of the liquid crystal layer 60 will be driven to rotate, and the dielectric constant of the liquid crystal layer 60 will be changed, thereby achieving phase shifting of the microwave signal(s) transmitted in the liquid crystal layer 60. Then, the microwave signal(s) in the first base plate 40 and the microwave signal(s) in in the liquid crystal layer 60 are transmitted interactively, thereby achieving a phase shift of the microwave signal(s) as a whole. As described above, the left end of the first conductive structure 21 and the left end of the second base plate 50 may be flush with each other, the right end of the second conductive structure 22 and the right end of the second base plate 50 may be flush with each other, and each end of the ground electrode 30 and the corresponding end of the first base plate 40 may be flush with each other. As such, each conductive wire 70 may be located only at the outside of the phase shifter without extending into the inside of the phase shifter, as shown in FIGS. 3 and 5, thereby effectively reducing the length, resistance, and inductance of each conductive wire 70. Therefore, a desired amount of phase shift is easily achieved.

For example, the first and second conductive structures 21 and 22 may be connected with conductive terminals of the ground electrode 30 (e.g., both ends of the ground electrode 30) through conductive wires 70, respectively. In this case, the signals applied to the ground electrode 30, the first conductive structure 21 and the second conductive structure 22 are the same, which facilitates the control of the phase shifter. As described above, a material of the conductive wire 70 may be metal, such as copper, but is not limited thereto, and may be silver, etc. Alternatively, it is also possible to provide conductive terminals at the edges of the second substrate (e.g., the left edges of the second base plate 50 and the first conductive structure 21 and the right edges of the second base plate 50 and the second conductive structure 22, as shown in FIG. 5) to separately control the ground electrode 30, the first conductive structure 21, and the second conductive structure 22.

For example, the sizes of the branch structures 12 of the first electrode layer 10 are the same, and the distances between every adjacent two of the branch structures connected to each of the first and second sides of the main body structure 11 are the same. Alternatively, the distances between every adjacent two of the branch structures connected to each of the first and second sides of the main body structure 11 may also be set according to a predetermined rule. Moreover, a width of a portion of each branch structure 12 overlapping the first conductive structure 21 or the second conductive structure 22 of the second electrode layer 20 may be different from a width of the remaining portion of the branch structure 12, as shown in FIG. 4C, so as to adjust a value of the capacitance formed between the branch structure 12 and the second electrode layer 20. Such configuration may be set according to the requirements of an actual product.

For example, in the present embodiment, the main body structure 11 and all of the branch structures 12 of the first electrode layer 10 may be formed as an integral structure (i.e., one-piece structure), i.e., the main body structure 11 and all of the branch structures 12 are formed in a same layer and made of a same material. In this way, both the main body structure 11 and all of the branch structures 12 may be formed in one patterning process, thereby increasing the production efficiency thereof.

For example, each of the first base plate 40 and the second base plate 50 may be a glass substrate with a thickness of 100 microns to 1000 microns, or a sapphire substrate, or may be a polyethylene terephthalate substrate, a triallyl cyanurate substrate, or a transparent flexible polyimide substrate, which has a thickness of 10 microns to 500 microns. For example, each of the first base plate 40 and the second base plate 50 may be made of high-purity quartz glass having extremely low dielectric loss. Compared with a general glass substrate, the first base plate 40 and/or the second base plate 50 made of high-purity quartz glass may reduce the loss of microwaves effectively, thereby ensuring the phase shifter to have low power consumption and a high signal-to-noise ratio. For example, the high-purity quartz glass may refer to quartz glass in which the weight percentage of $SiO_2$ is 99.9% or more.

For example, a material of each of the microstrip, the ground electrode 30, the first conductive structure 21, and the second conductive structure 22 may be a metal such as aluminum, silver, gold, chromium, molybdenum, nickel, iron, or the like.

For example, the liquid crystal molecules 61 of the liquid crystal layer 60 may be positive liquid crystal molecules 61 or negative liquid crystal molecules 61. It should be noted that, in a case where the liquid crystal molecules 61 are positive liquid crystal molecules 61, an angle between a long axis direction of each liquid crystal molecule 61 and a plane where the first base plate 40 (or the second base plate 50) is located is greater than 0 degree and is equal to or less than 45 degrees. In a case where the liquid crystal molecules 61 are negative liquid crystal molecules 61, an angle between the long axis direction of each liquid crystal molecule 61 and the plane where the first base plate 40 (or the second base plate 50) is located is greater than 45 degrees and smaller than 90 degrees. As such, it is guaranteed that the dielectric constant of the liquid crystal layer 60 is changed after the liquid crystal molecules 61 are driven to rotate, thereby achieving the purpose of phase shifting.

The microstrip of the phase shifter according to the present embodiment may not only transmit microwave signals but also receive a first voltage applied to the microstrip, and the first conductive structure 21 and the second conductive structure 22 may receive a second voltage, which is different from the first voltage, applied to the first conductive structure 21 and the second conductive structure 22. As such, an electric field is formed between the plurality of branch structures 12 connected to the first side of the main body structure 11 of the microstrip and the first conductive structure 21, and between the plurality of branch structures 12 connected to the second side of the main body structure 11 of the microstrip and the second conductive structure 22, to drive the liquid crystal molecules 61 in respective portions of the liquid crystal layer 60 to rotate, thereby changing the dielectric constant of the liquid crystal layer 60, and achieving phase shifting of microwave signals. In the present embodiment, since the second electrode layer 20 is disposed in the peripheral region of the second base plate 50, the length of the conductive wire 70 for applying the second voltage to the second electrode layer 20 may be shortened, and the inductance and the resistance of the conductive wire 70 may be reduced more effectively, thereby performing a more effective phase shift on a microwave signal.

In any one of the embodiments shown in FIGS. 2 to 5, the main body structure 11 of the first electrode layer 10 may further include an impedance matching region (e.g., a region where an arrow pointing towards the left in FIG. 2 or 4A is located). The impedance matching region may be a triangle (including any type of triangle), a trapezoid, or another shape in a plan view, configured to make impedances of respective portions (e.g., a left portion and a right portion of the arrow) of the first electrode layer 10 to match to each other (e.g., be equal to each other), so as to reduce energy loss of a microwave signal, thereby efficiently transmitting the microwave signal. For example, the shape of the impedance matching region in a plan view may depend on factors such as a frequency of an input microwave signal, shapes and sizes of the main body structure 11 and the branch structures 12 of the first electrode 10, a shape and a size of a conductor on the left side of the impedance matching region of FIGS. 2 and 4A, and the like, and may be designed according to a practical application.

In any one of the embodiments shown in FIGS. 2 to 5, a thickness of a liquid crystal cell (e.g., a size of a portion of the liquid crystal layer 60 between the first electrode layer 10 and the second electrode layer 20 in the vertical direction, as shown in FIG. 5) may be between about 5 microns and about 20 microns, such as between about 5 microns and about 10 microns, such as about 5 microns. The thickness of the liquid crystal cell is small so that the liquid crystal molecules 61 of the liquid crystal layer 60 can rapidly rotate in response to the presence of an electric field. As such, the liquid crystal cell has a fast response speed.

It should be understood that although the second electrode layer 20 in FIG. 2 and each of the first and second conductive structures 21 and 22 in FIG. 4A are illustrated as non-rectangular, this is merely exemplary. For example, each of the second electrode layer 20 in FIG. 2 and the first and second conductive structures 21 and 22 in FIG. 4A may be rectangular or irregular in shape, as long as the size of an overlapping area of each branch structure 12 and each of the second electrode layer 20 in FIG. 2 and the first and second conductive structures 21 and 22 in FIG. 4A is adjusted to form a desired value of capacitance.

The present embodiment further provides a liquid crystal antenna including the liquid crystal phase shifter according to any one of the embodiments corresponding to FIGS. 2 to 5. As described above, the phase shifting effect of the liquid crystal phase shifter is excellent. Therefore, the liquid crystal antenna has high efficiency or low power consumption.

For example, at least two patch units may be further disposed at a side of the second base plate 50 distal to the liquid crystal layer 60, and for example, a gap between any adjacent two of the patch units is set corresponding to a gap between any adjacent two of the branch structures 12 (e.g., an orthographic projection of the gap between any adjacent two of the patch units on the first base plate 40 or the second base plate 50 overlaps an orthographic projection of the gap between any adjacent two of the branch structures 12 on the first base plate 40 or the second base plate 50). In this way, the microwave signals phase-adjusted by the phase shifter according to any one of the embodiments of FIGS. 2 to 5 may be radiated outwards through the gap between any adjacent two of the patch units. Alternatively, the feed interface may also be included in the liquid crystal antenna for feeding a microwave signal from a cable to the microwave transmission structure (e.g., the microstrip).

An embodiment of the present disclosure provides a communication apparatus including the liquid crystal antenna according to the above-described embodiment of the present disclosure.

An embodiment of the present disclosure provides a method for operating a liquid crystal phase shifter, which may be the liquid crystal phase shifter according to any one of the embodiments corresponding to FIGS. 2 to 5, and the method may include: applying a first voltage to the first electrode layer 10; and applying a second voltage different from the first voltage to the second electrode layer 20 to generate an electric field between the first electrode layer 10 and the second electrode layer 20, such that the long axes of the liquid crystal molecules 61 of the liquid crystal layer 60 are substantially parallel (for positive liquid crystal molecules) or substantially perpendicular (for negative liquid crystal molecules) to the direction of the electric field.

The embodiments described above may be combined with each other in a case where there is no explicit conflict.

It should be understood that the above embodiments are merely exemplary embodiments for explaining the principle of the present disclosure, and the present disclosure is not limited thereto. It will be apparent to one of ordinary skill in the art that various changes and modifications may be made therein without departing from the spirit and essence of the present disclosure, and these changes and modifications also fall within the scope of the present disclosure.

What is claimed is:

1. A liquid crystal phase shifter, comprising
a first substrate and a second substrate opposite to each other, and a liquid crystal layer between the first substrate and the second substrate; wherein
the first substrate comprises a first base plate and a first electrode layer at a side of the first base plate proximal to the liquid crystal layer;
the second substrate comprises a second base plate and a second electrode layer at a side of the second base plate proximal to the liquid crystal layer; and
the first electrode layer comprises a main body structure having a first side and a second side opposite to each other with respect to a length direction of the main body structure, and a plurality of branch structures connected to at least one of the first side and the second side of the main body structure,
wherein the second electrode layer is in a peripheral region of the second base plate, and an orthographic projection of the second electrode layer on the first base plate partially overlaps an orthographic projection of at least one of the plurality of branch structures on the first base plate.

2. The liquid crystal phase shifter according to claim 1, wherein each of the first side and the second side of the main body structure is connected with the plurality of branch structures.

3. The liquid crystal phase shifter according to claim 2, wherein the plurality of branch structures connected to the first side and the plurality of branch structures connected to the second side are symmetric about the main body structure.

4. The liquid crystal phase shifter according to claim 3, wherein the second electrode layer comprises a first conductive structure and a second conductive structure;
an orthographic projection of the first conductive structure on the first base plate partially overlaps an orthographic projection of at least one of the plurality of branch structures connected to the first side of the main body structure on the first base plate; and
an orthographic projection of the second conductive structure on the first base plate partially overlaps an orthographic projection of at least one of the plurality of branch structures connected to the second side of the main body structure on the first base plate.

5. The liquid crystal phase shifter according to claim 4, wherein the first electrode layer is a microstrip, and a ground electrode is at a side of the first base plate distal to the liquid crystal layer.

6. The liquid crystal phase shifter according to claim 5, wherein the first and second conductive structures are connected to conductive terminals of the ground electrode through conductive wires, respectively, and at least one of a resistivity and an inductance of each of the conductive wires is less than a corresponding one of a resistivity and an inductance of an ITO material.

7. The liquid crystal phase shifter according to claim 4, wherein the first and second conductive structures are both plate electrodes.

8. A liquid crystal phase shifter, comprising
a first substrate and a second substrate opposite to each other, and a liquid crystal layer between the first substrate and the second substrate; wherein
the first substrate comprises a first base plate and a first electrode layer at a side of the first base plate proximal to the liquid crystal layer;
the second substrate comprises a second base plate and a second electrode layer at a side of the second base plate proximal to the liquid crystal layer; and
the first electrode layer comprises a main body structure having a first side and a second side opposite to each other with respect to a length direction of the main body structure, and a plurality of branch structures connected to at least one of the first side and the second side of the main body structure,
wherein only one of the first side and the second side of the main body structure is connected with the plurality of branch structures, and the second electrode layer is at only one side of the second base plate corresponding to the plurality of branch structures.

9. The liquid crystal phase shifter according to claim 8, wherein the second electrode layer is a plate electrode.

10. The liquid crystal phase shifter according to claim 8, wherein the first electrode layer is a microstrip, and a ground electrode is at a side of the first base plate distal to the liquid crystal layer.

11. The liquid crystal phase shifter according to claim 10, wherein the second electrode layer is connected to a conductive terminal of the ground electrode through a conductive wire, and at least one of a resistivity and an inductance of the conductive wire is less than a corresponding one of a resistivity and an inductance of an ITO material.

12. The liquid crystal phase shifter according to claim 1, wherein the plurality of branch structures at a same side of the main body structure have a same shape; and
wherein every adjacent two of the plurality of branch structures at the same side have a same distance therebetween.

13. The liquid crystal phase shifter according to claim 1, wherein the main body structure and the plurality of branch structures at either of the first and second sides are an integrally formed structure; and
wherein a material of the first substrate comprises at least one of glass, ceramic and high-purity quartz glass.

14. The liquid crystal phase shifter according to claim 1, wherein the liquid crystal layer comprises positive liquid crystal molecules, and an angle between a long axis direction of each of the positive liquid crystal molecules and a plane where the first base plate is located is greater than 0 degree and equal to or less than 45 degrees; or
wherein the liquid crystal layer comprises negative liquid crystal molecules, and an angle between a long axis direction of each of the negative liquid crystal molecules and a plane where the first base plate is located is greater than 45 degrees and smaller than 90 degrees.

15. The liquid crystal phase shifter according to claim 1, wherein the main body structure of the first electrode layer comprises an impedance matching region, which is triangular or trapezoidal in a plan view, and is configured to make impedances of portions of the first electrode layer match to each other.

16. The liquid crystal phase shifter according to claim 1, wherein a thickness of a portion of the liquid crystal layer between the first electrode layer and the second electrode layer is in a range of 5 microns to 20 microns.

17. A liquid crystal antenna, comprising the liquid crystal phase shifter according to claim 1.

18. A communication apparatus, comprising the liquid crystal antenna according to claim 17.

19. A method for operating a liquid crystal phase shifter, wherein the liquid crystal phase shifter is the liquid crystal phase shifter according to claim 1, and the method comprises
applying a first voltage to the first electrode layer; and
applying a second voltage different from the first voltage to the second electrode layer to generate an electric field between the first electrode layer and the second electrode layer, such that long axes of liquid crystal molecules of the liquid crystal layer are substantially parallel or substantially perpendicular to a direction of the electric field.

20. The liquid crystal phase shifter according to claim 8, wherein the plurality of branch structures at a same side of the main body structure have a same shape; and
wherein every adjacent two of the plurality of branch structures at the same side have a same distance therebetween.

* * * * *